United States Patent [19]
Block et al.

[11] 3,958,463
[45] May 25, 1976

[54] ADJUSTABLE CAM ACTUATED SWITCH MECHANISM

[75] Inventors: Bruce E. Block; Roger H. Stohlquist, both of Rockford, Ill.

[73] Assignee: Rockford Automation, Inc., Rockford, Ill.

[22] Filed: June 20, 1975

[21] Appl. No.: 588,606

[52] U.S. Cl. ............................ 74/568 R; 74/10.52; 74/568 T; 200/38 BA; 200/153 LB
[51] Int. Cl.² ........................................ F16H 53/04
[58] Field of Search ............ 74/568 T, 568 R, 805, 74/802, 10.52; 200/38 BA, 153 LB

[56] References Cited
UNITED STATES PATENTS

| | | | |
|---|---|---|---|
| 2,852,630 | 9/1958 | Burrows | 200/47 |
| 3,496,802 | 2/1970 | Cork et al. | 74/805 |

FOREIGN PATENTS OR APPLICATIONS

| | | | |
|---|---|---|---|
| 1,095,078 | 12/1960 | Germany | 74/10.52 |

*Primary Examiner*—Benjamin W. Wyche
*Assistant Examiner*—F. D. Shoemaker
*Attorney, Agent, or Firm*—Morsbach & Pillote

[57] ABSTRACT

Adjustable cam actuated switch mechanism of the type in which the switch is operated by a rotating cam means on a timing shaft. The cam means includes a cam plate that is rotatable relative to the timing shaft and the cam plate is adjustably connected to the shaft through a differential gear mechanism including a pair of spur gears of like pitch diameter but having relatively different number of teeth, one of which is drivingly connected to the timing shaft and the other of which is drivingly connected to the cam plate and a pinion gear that meshes with both spur gears and is carried by a housing that encloses the spur gears and which is rotatable relative to the timing shaft to angularly adjust the cam relative to the shaft.

5 Claims, 4 Drawing Figures

3,958,463

ADJUSTABLE CAM ACTUATED SWITCH MECHANISM

BACKGROUND OF THE INVENTION

The present invention relates generally to switch mechanisms and more particularly to an adjustable cam actuated switch mechanism.

Cam actuated switch mechanisms are commonly used to effect cyclic operations of one or more devices in timed relation with the rotation of a timing shaft and it is frequently desirable to adjust the cam relative to the timing shaft to adjust the timing cycle. U.S. Pat. No. 3,496,802 discloses a rotary switch mechanism in which the cam is drivingly connected to the timing shaft for anglular adjustment relative thereto to a gear system that includes a pair of annular ring gears having a relatively different number of teeth and the same pitch diameter and a resilient annular pinion gear disposed internally of the ring gears and a rotary cam member received within the annular pinion gear to press the teeth on the annular pinion gear into engagement with the ring gears.

SUMMARY OF THE INVENTION

It is a general object of the present invention to provide an improved adjustable cam actuated switch mechanism which is of simple and more economical construction than prior devices and in which the angular position of the cam relative to the timing shaft can be easily adjusted by hand.

In the cam actuated switch mechanism of the present invention, the switch is operated by a rotary cam means on a timing shaft and the cam means includes an annular housing mounted for rotation relative to the timing shaft and having a gear receiving cavity opening at one end of the housing with drive and driven spur gears disposed in the gear receiving cavity and having a like pitch diameters and a relatively different number of teeth. The drive spur gear is non-rotatably connected to the timing shaft and the driven spur gear is rotatable relative to the timing shaft and non-rotatably connected to a cam plate that overlies the end of the housing and closes the end of the gear cavity, and a pinion gear is mounted on the housing and in meshing engagement with both spur gears whereby the drive spur gear will normally operate through the pinion gear and the driven spur gear to drive the cam plate in unison with the timing shaft, and turning of the housing member relative to the timing shaft causes angular adjustment of the cam member relative to the timing shaft. The pinion gear is advantageously preloaded in a direction radially of the spur gears to minimize backlash.

These, together with other features and advantages of the present invention will be more readily understood by reference to the following detailed description when taken in connection with the accompanying drawings wherein.

Figure 1:
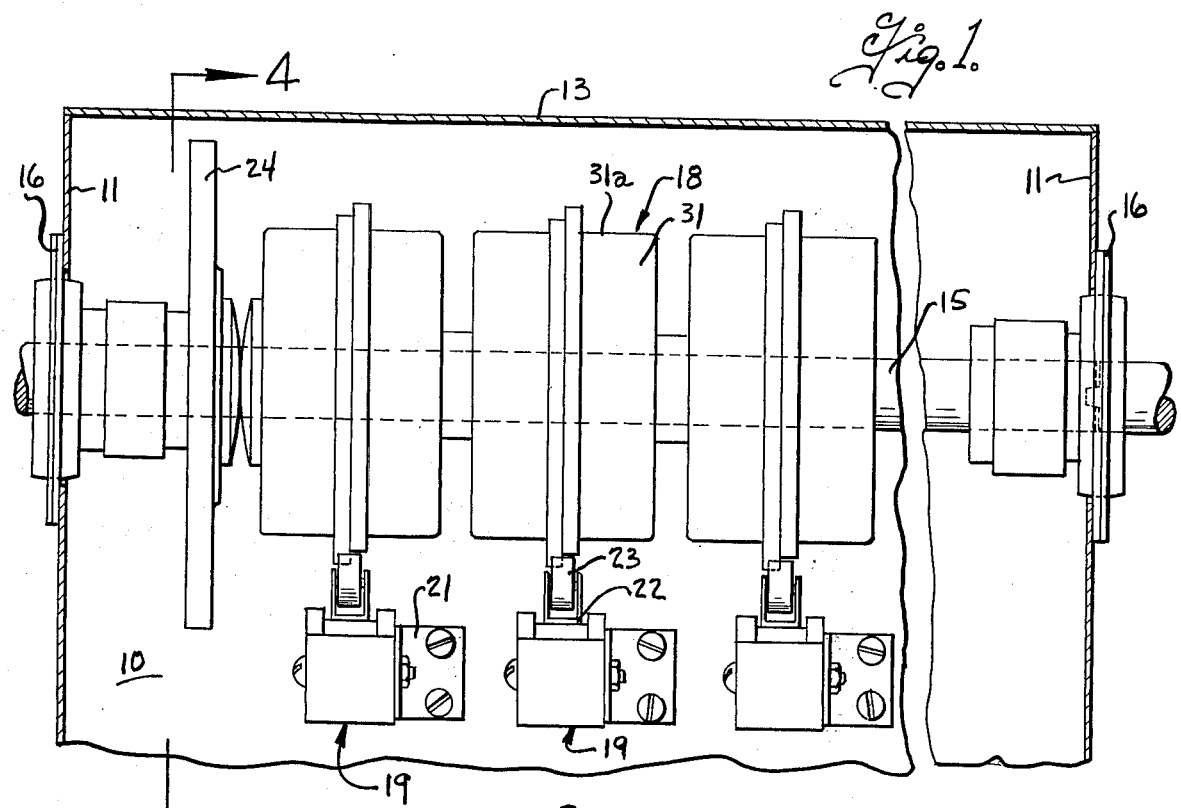
FIG. 1 is a sectional view through a timing apparatus embodying the cam actuated switch mechanism of the present invention.
Figure 2:
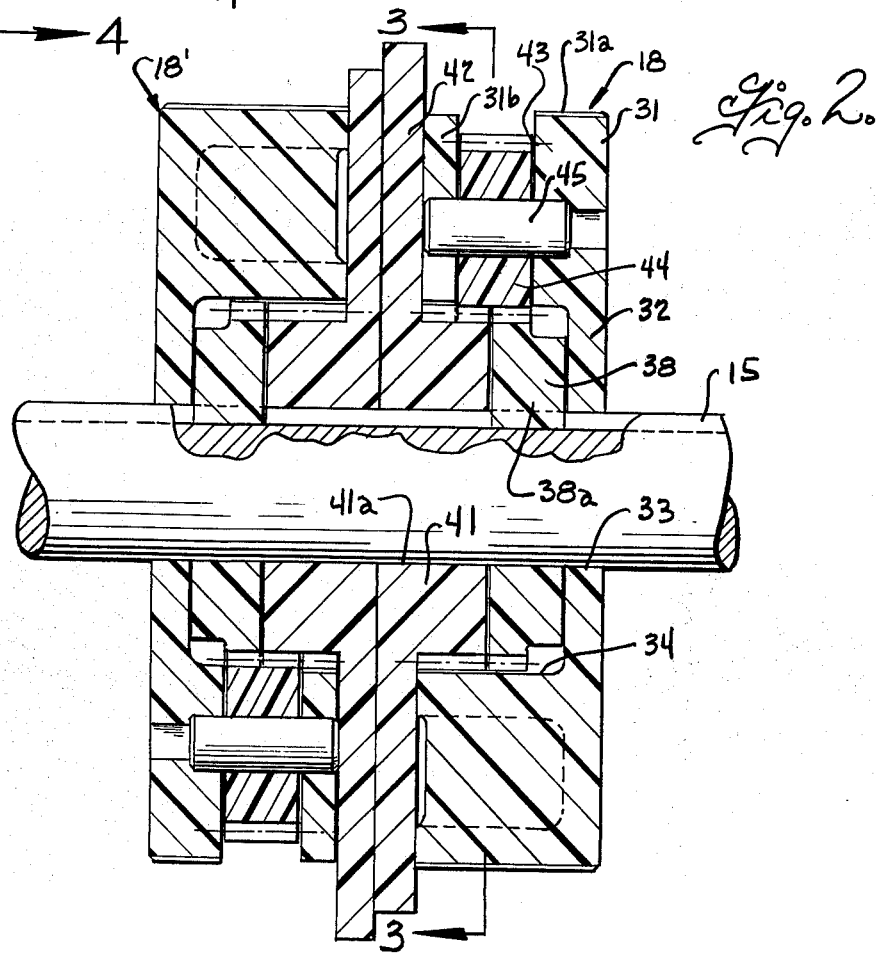
FIG. 2 is a sectional view through the adjustable cam mechanism and on a larger scale than FIG. 1.
Figure 3:
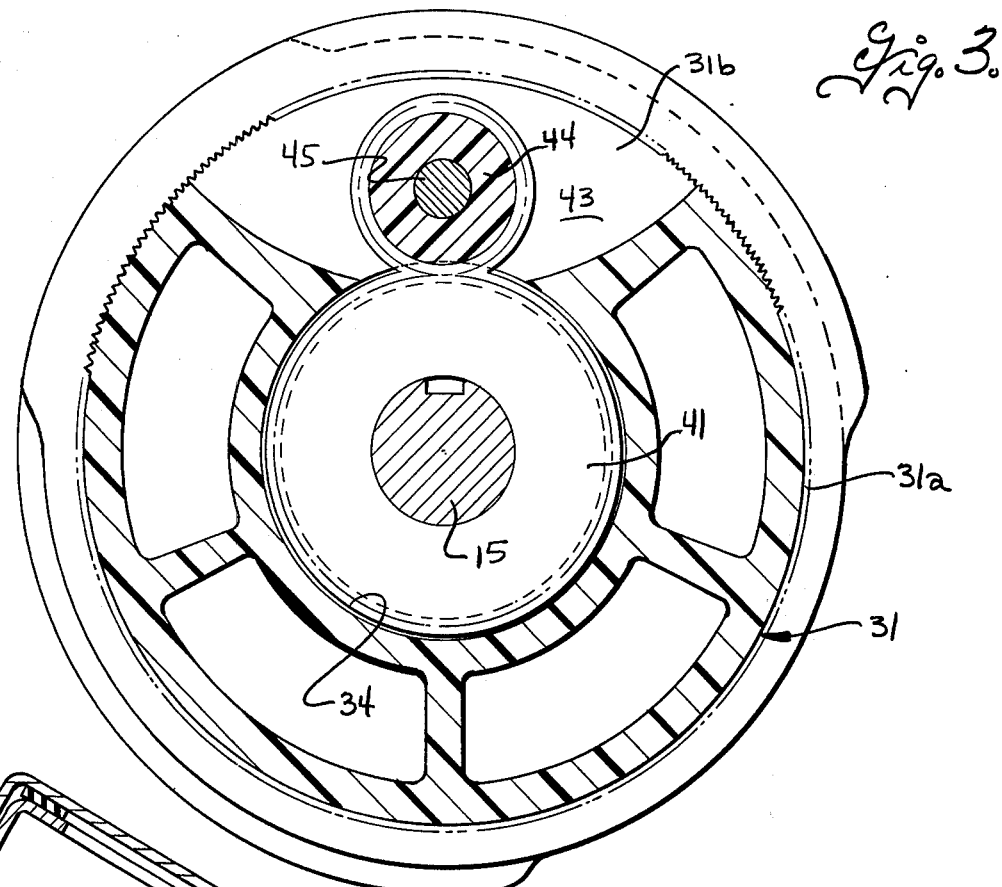
FIG. 3 is a transverse sectional view taken on the plane 3—3 of FIG. 2.
Figure 4:
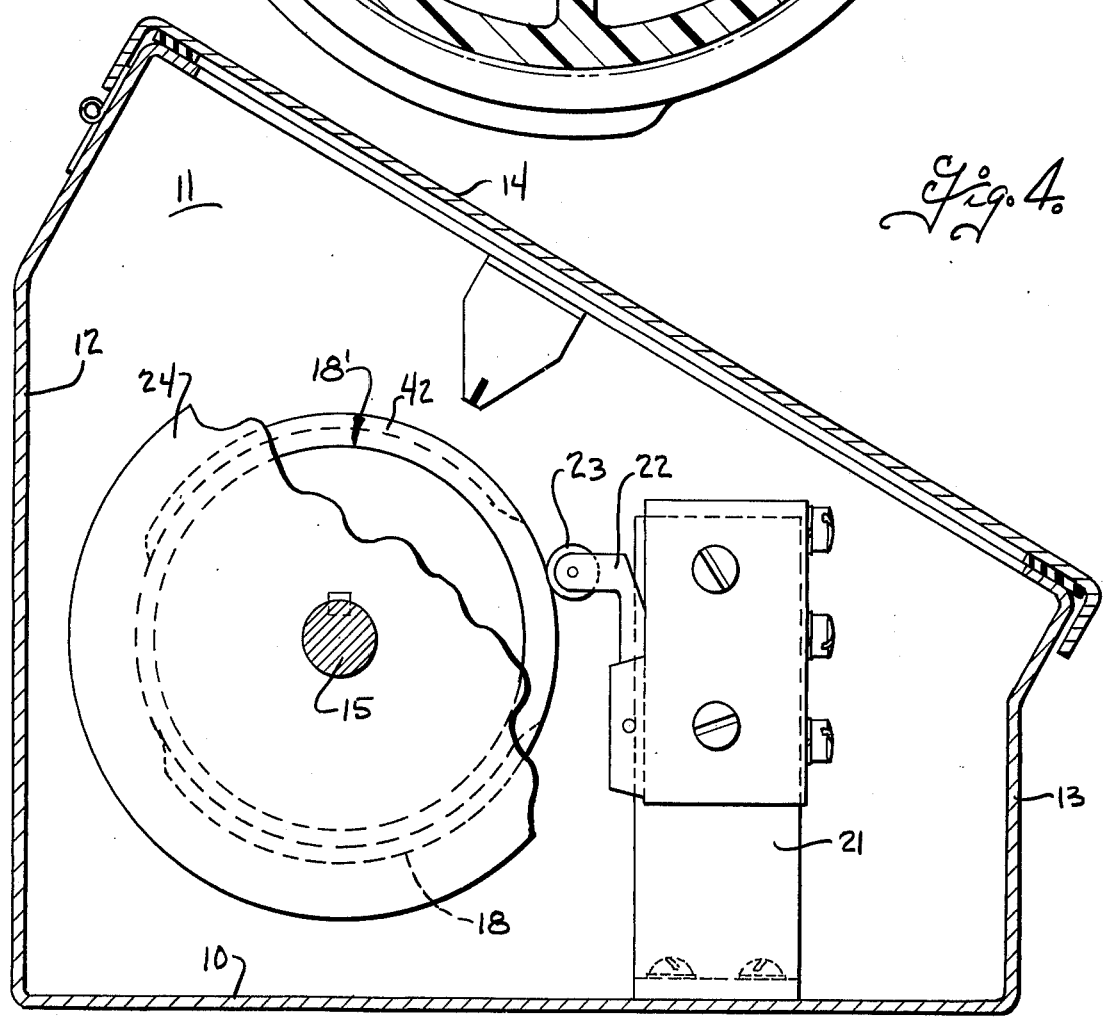
FIG. 4 is a transverse sectional view through the timing mechanism of FIG. 1 taken on the plane 4—4.

Reference is first made to FIGS. 1 and 4 illustrating a timing apparatus embodying the adjustable cam actuated switch mechanism of the present invention. The timing mechanism is conveniently enclosed in a housing having a bottom wall 10, end walls 11, front and rear walls 12, and 13 and a hinged cover 14. A timing shaft 15 is rotatably supported in bearings 16 on the end walls 11 and one or more adjustable cam assemblies 18 are mounted on the timing shaft for operating switches 19. The switches 19 are mounted as by brackets 21 on the base 10 and, as is conventional, the switches have a control element for operating the same and a cam follower 23 engageable with a cam on the cam shaft to operate the switch in response to rotation of the cam. A protractor dial 24 is advantageously keyed to the timing shaft 15 for rotation therewith to indicate the angular position of the timing shaft and the cam assemblies 18 are mounted on the shafts so as to enable angular adjustment of the cams relative to the timing shaft.

The adjustable cam assemblies 18 each include an annular housing 31 having an end wall 32 at one end that is rotatably supported on the timing shaft 15. In the form shown, the housing 31 is formed with an axial opening 33 dimensioned to rotatably receive the shaft 15 and the housing has a gear receiving cavity 34 extending from the end wall 32 around the shaft and opening at the other end of the annular housing. A first spur gear 38, hereinafter sometimes referred to as a drive gear, is disposed in the inner end of the gear receiving cavity 34 and has a key means 38a non-rotatably connecting the gear 38 to the timing shaft 15 for rotation therewith. A second spur gear 41 having the same pitch diameter as the spur gear 38 having a relatively different number of teeth, is disposed in the gear receiving cavity 34 alongside the gear 38. The gear 41, herein sometimes referred to as the driven gear, is rotatably supported on the shaft 15 and for this purpose has a circular opening 41a dimensioned to rotatably receive the shaft. A cam plate 42 overlies the end of the housing and the end of the gear receiving cavity 34 to close the latter and the cam plate 32 is also mounted for rotation relative to the shaft 15. In the embodiment illustrated, the cam plate 42 is formed integrally with the driven gear 41 and extends from the shaft 15 outwardly beyond the outer periphery of the housing 31. Housing 31 has a peripheral wall 31a and the wall is preferably ribbed or knurled to provide a non-slip surface that can be engaged by the fingers of one hand to turn the housing relative to the shaft.

The first gear receiving cavity 34 is advantageously dimensioned to closely surround the periphery of the spur gears and the housing has a wall portion 31b located outwardly of the spur gears and at the end of the housing opposite the end wall 32 and which is spaced from the end wall to define a second gear receiving cavity 43 outwardly of the spur gears. A pinion gear 44 is disposed in the second gear receiving cavity 43 and is rotatably mounted on a pintle 45 with its gear teeth in meshing engagement with both of the spur gears 38 and 41. The pintle extends into aligned openings in both the end wall 31 and end wall porton 31b to provide firm radial support for the pinion.

As previously described, the spur gears 38 and 41 have the same pitch diameter and outer diameter but have relatively different number of teeth on their outer periphery. For example, the drive spur gear 38 can be formed with 35 teeth and the driven gear 41 formed with 36 teeth so that, when the housing 31 is rotated through one revolution relative to the shaft 15, it will cause one spur gear to index relative to the other a distance corresponding to one tooth space. With the drive gear having 35 teeth and the driven gear 36 teeth, the driven gear will be angularly advanced in the direction of rotation of the housing 1/36 of a revolution each time the housing is rotated through one complete revolution. In other words, each complete revolution of the housing 31 relative to the timing shaft will advance the driven gear 41 and hence the cam plate 42 through 10°. As will be appreciated, the number of teeth on the spur gears can be varied as desired to change the angular adjustment of the cam for each revolution of the housing relative to the timing shaft. However, the driven gear 41 preferably has one more teeth than the drive gear 38 so that the driven gear will be advanced in the same direction of rotation as the housing 41, but at a reduced rate.

Since the spur gears 38 and 41 have the same pitch diameter but have relatively different number of teeth, the circular pitch of the teeth on the gears 38 and 41 will be slightly different and the gear 38 having the lesser number of teeth will have a slightly greater circular pitch than the other gear 41. This means that the width of the teeth at the pitch circle and the spacing between the adjacent teeth on the pitch circle of the two gears will necessarily be somewhat different. The pinion gear 44, however, must mesh with both spur gears 38 and 41. While it is possible to form the pinion gear 44 with different tooth forms at opposite ends, to accommodate spur gears having different circular pitches, it has been found that backlash can be effectively avoided by forming the gear 38 having the lesser number of teeth with teeth that are slightly oversize and by forming the gear 41 with the greater number of teeth with teeth that are slightly undersize from standard tooth forms and by radially preloading the pinion gear 44 against the spur gears 38 and 41. The pintle 45 is mounted on the housing at a location spaced from the axis of the timing shaft 15 with slightly less, for example of the order of a few thousandths, then ½ the sum of the pitch diameters of the pinion gear 44 and the spur gears 41 to radially preload the pinion gear against the spur gears. Most so-called "rigid" plastics will deform somewhat under pressure and the gears and housing are preferably formed of a rigid plastic material which can deform sufficient to accommodate the preloading. Alternatively, if the spur gears and housing are formed of a very rigid material such as metal, then the pinion gear should either be formed of a more resilient material or mounted as by a resilient bushing of rubber or the like on the pintle 45, to provide a resilient mounting that will accommodate the radial preloading of the gears described above.

The cam plate 42 has a cam lobe 42a on its outer periphery engageable with the follower 23 to operate the switch 19. It is frequently desirable to enable independent adjustment of the position at which the switch is actuated relative to the position at which it is deactuated. Accordingly, the adjustable cam assemblies 18 are advantageously arranged in pairs designated 18, 18' with the cam assemblies of each pair disposed in axially inverted relation to have the cam plates of the pair in abutting relation. As will be seen, the construction of the cam assemblies 18, 18' is that they can be used without modification in pairs and arranged in an axially inverted relation on the shaft so that the cam plates of the adjacent pair can be engaged by a single follower 23 to actuate a switch. With this arrangement, the cam plate on one switch assembly will operate the switch to one position and the cam plate on the other switch assembly will control operation of the switch to a second position.

A plurality of pairs of adjustable cam assemblies 18 can be mounted on a timing shaft 15 in the housing. If additional timing functions are desired, additional timers of like construction can be positioned in end-to-end relation and the timing shafts 15 interconnected. As shown, the timing shafts 15 are formed with a tapered diametrically extending groove in each and adapted to receive an oldham type coupling having correspondingly tapered keys to interconnect the timing shafts on adjacent timing assemblies.

From the foregoing it is thought that the construction and use of the adjustable cam actuator switch mechanism will be readily understood. The timing apparatus utilizes spur gears which can be economically formed as by molding from plastic or the like and the drive and driven spur gears as well as the pinion gear are effectively enclosed by the housing 31 and cam plate 42. The drive gear 38, driven gear 41, cam plate 42, and housing 31 are all supported directly on the shaft 15 so that the several parts are maintained in proper concentric relation by direct engagement with the shaft. The drive gear 38, which is keyed to the timing shaft, normally operates through the pinion gear 34 and driven gear 41 to drive the cam plate 42 in unison with the timing shaft. However, the angular position of the cam plate 42 can be easily adjusted relative to the timing shaft by merely turning the housing 31 relative to a timing shaft.

While the preferred embodiment of the invention has herein been illustrated and described this has been done by the way of illustration and not limitation and the invention should not be limited except as required by the scope of the appended claims.

The embodiments of the invention in which an exclusive property or privilege is claimed are defined as follows:

1. In a cam actuated switch mechanism including a switch having a control element and adapted to be operated by displacement of the control element, a timing shaft, a rotary cam means on the timing shaft, and a cam follower engageable with the cam means for operating the switch control element in response to rotation of the cam means, the improvement comprising: said cam means including an annular housing having the first end wall at one end mounted for rotation relative to the timing shaft and a peripheral wall extending from said first end wall coaxial with the timing shaft, the housing having a first gear receiving cavity extending from said first end wall around the timing shaft and opening at the other end of the annular housing, a first spur gear in said first gear receiving cavity adjacent said first end wall and non-rotatably connected to said timing shaft for rotation therewith, a second spur gear in said first gear receiving cavity mounted for rotation relatives to the shaft, a cam plate mounted for rotation relative to the timing shaft and non-rotatably connected to said second spur gear, said cam plate overlying the other end of the housing to close said first gear receiving cavity and having cam lobe means on its outer periphery for actuating the cam follower, said first and second spur gears having relatively different numbers of external teeth and the same pitch diameter, said annular housing having a second end wall portion at said other end of the housing spaced radially outwardly from said first and second spur gears and spaced axially from said first end wall to define a second gear receiving cavity radially outwardly of said first and second spur gears, and a pinion gear in said second gear receiving cavity and having shaft means mounting said pinion on said first end wall and said second end wall portion for rotation about an axis paralleling the timing shaft and in meshing engagement with said first and second spur gears whereby the first spur gear driven by the timing shaft will normally operate through the pinion gear and the second spur gear to drive the cam plate in unison with the timing shaft, and turning of said housing relative to the timing shaft causes turning the cam plate relative to the timing shaft at a reduced rate.

2. A cam actuated switch mechanism according to claim 1 wherein the axis of the shaft means for the pinion gear is spaced from the axis of said timing shaft a distance slightly less than one-half the sum of the pitch diameter of the pinion gear and the pitch diameter of the spur gears to radially preload the pinion gear against the spur gears.

3. A cam actuated switch according to claim 2 wherein said spur and pinion gears and housing are formed of a plastic material.

4. A cam actuated switch according to claim 1 wherein the first gear receiving cavity has an annular wall closely surrounding the peripheries of said second spur gear.

5. A cam actuated switch mechanism according to claim 1 wherein a pair of said cam means are mounted in axially inverted relation on the shaft with the cam plates of the pair of cam means in abutting relation, and said cam follower means engages the cam lobe means on both cam plates in said pair of cam means.

* * * * *